Oct. 23, 1934.    C. C. SIMERAL ET AL    1,977,651
FURNACE
Filed Oct. 18, 1930    4 Sheets-Sheet 2
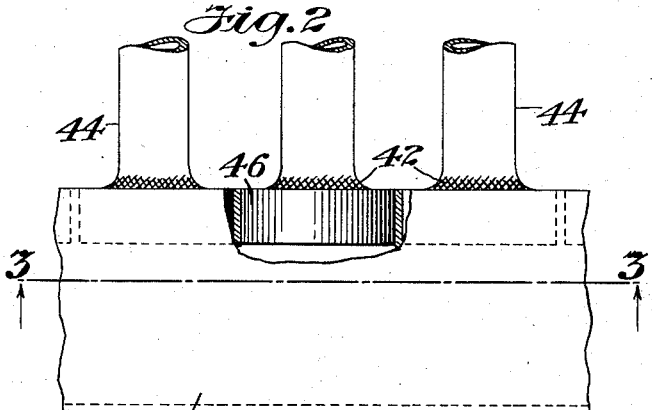
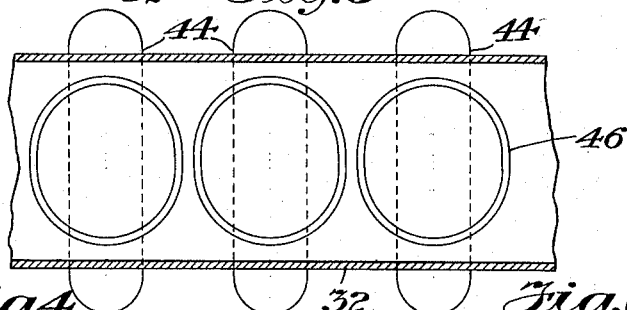
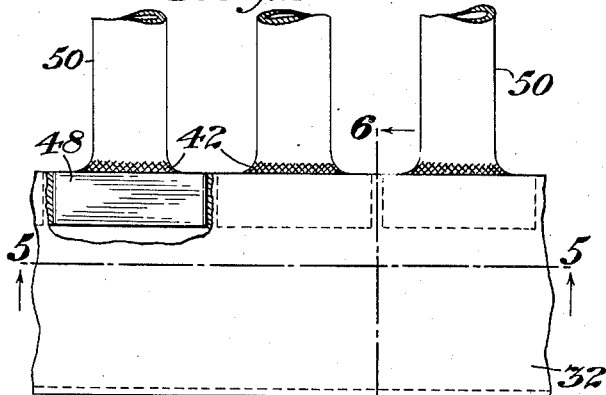
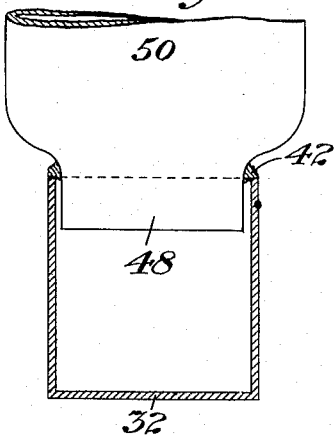
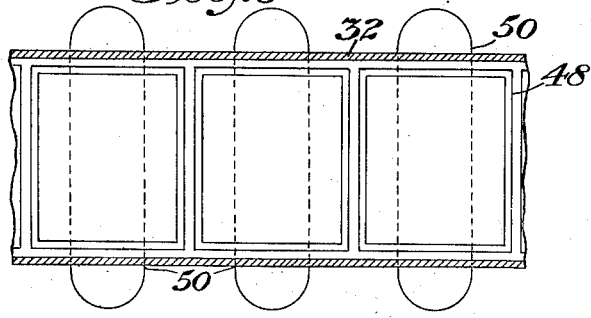
INVENTORS
Claire C. Simeral
BY Alf Drill
ATTORNEY

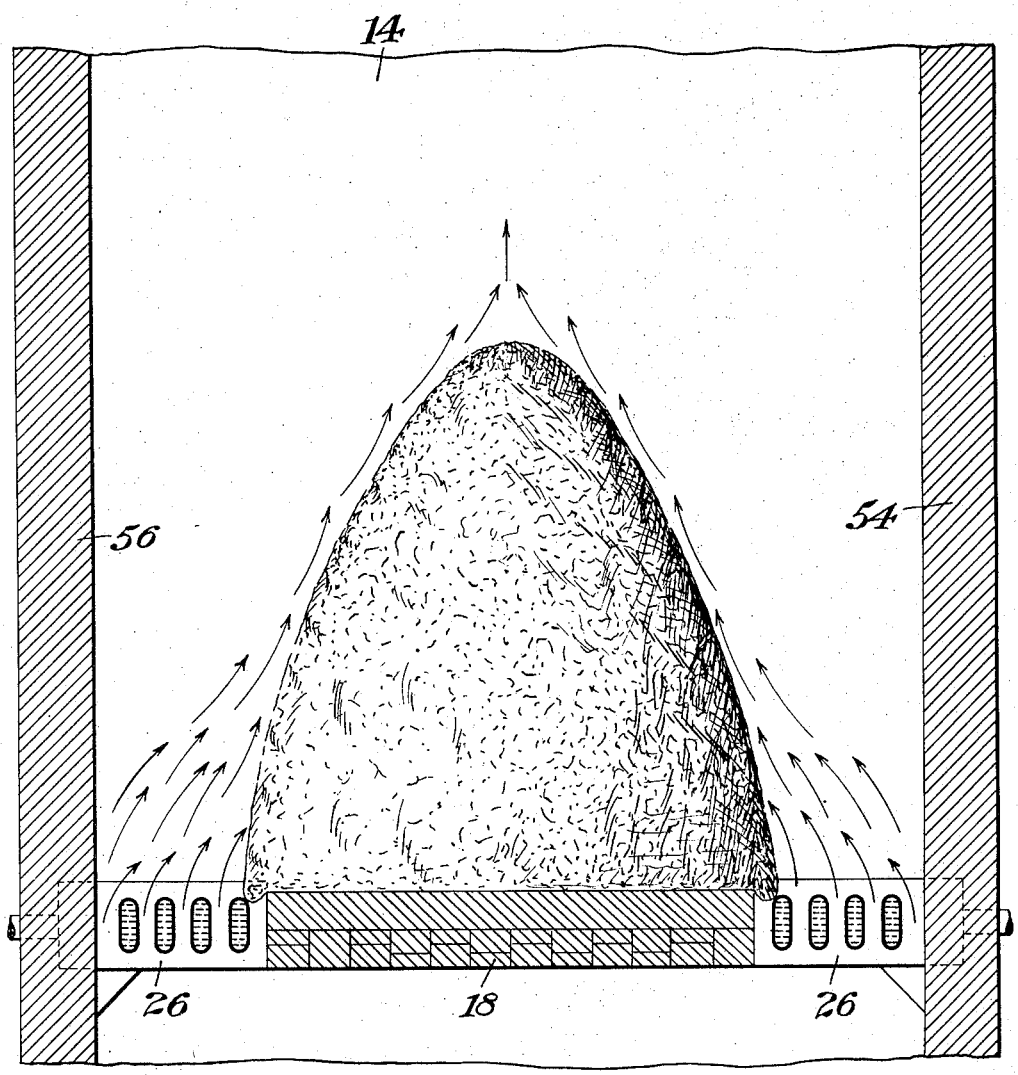

Oct. 23, 1934.  C. C. SIMERAL ET AL  1,977,651
FURNACE
Filed Oct. 18, 1930    4 Sheets-Sheet 4

INVENTORS
Claire C. Simeral
BY Alf Drill
ATTORNEY

Patented Oct. 23, 1934

1,977,651

UNITED STATES PATENT OFFICE 1,977,651

FURNACE

Claire C. Simeral and Alf Drill, Portland, Oreg.

Application October 18, 1930, Serial No. 489,510

7 Claims. (Cl. 122—7)

This invention presents improvements in furnaces. It is particularly concerned with boiler furnaces which burn waste wood or similar fuels, and especially that known in lumber districts as hog fuel.

The invention also presents a particular furnace grate structure having a central fuel supporting table and water cooled side sections for promoting effective combustion and for decreasing the periods of outage and the cost of grate maintenance.

A further object of the invention is to provide a water cooled furnace grate constructed in a novel manner whereby an important reduction in time of outage and cost of grate maintenance is effected.

Other objects of the invention will appear as the following description proceeds.

In the accompanying drawings:

Fig. 1 is a vertical sectional view of a boiler setting having the illustrative furnace construction on either side of a central flame chamber.

Fig. 2 is a detail view indicating the relationship of the grate to a header.

Fig. 3 is a section taken on the line 3—3 of Fig. 2.

Fig. 4 is a partial elevation of modified form of similar grate construction.

Fig. 5 is a section of the grate construction shown in Fig. 4 taken on the line 5—5 of Fig. 4.

Fig. 6 is a detail sectional view taken on the line 6—6 of Fig. 4.

Fig. 7 is a diagrammatic detail view indicating the side grate and central solid hearth of the furnace and the manner in which the fuel is burned.

Figure 1:
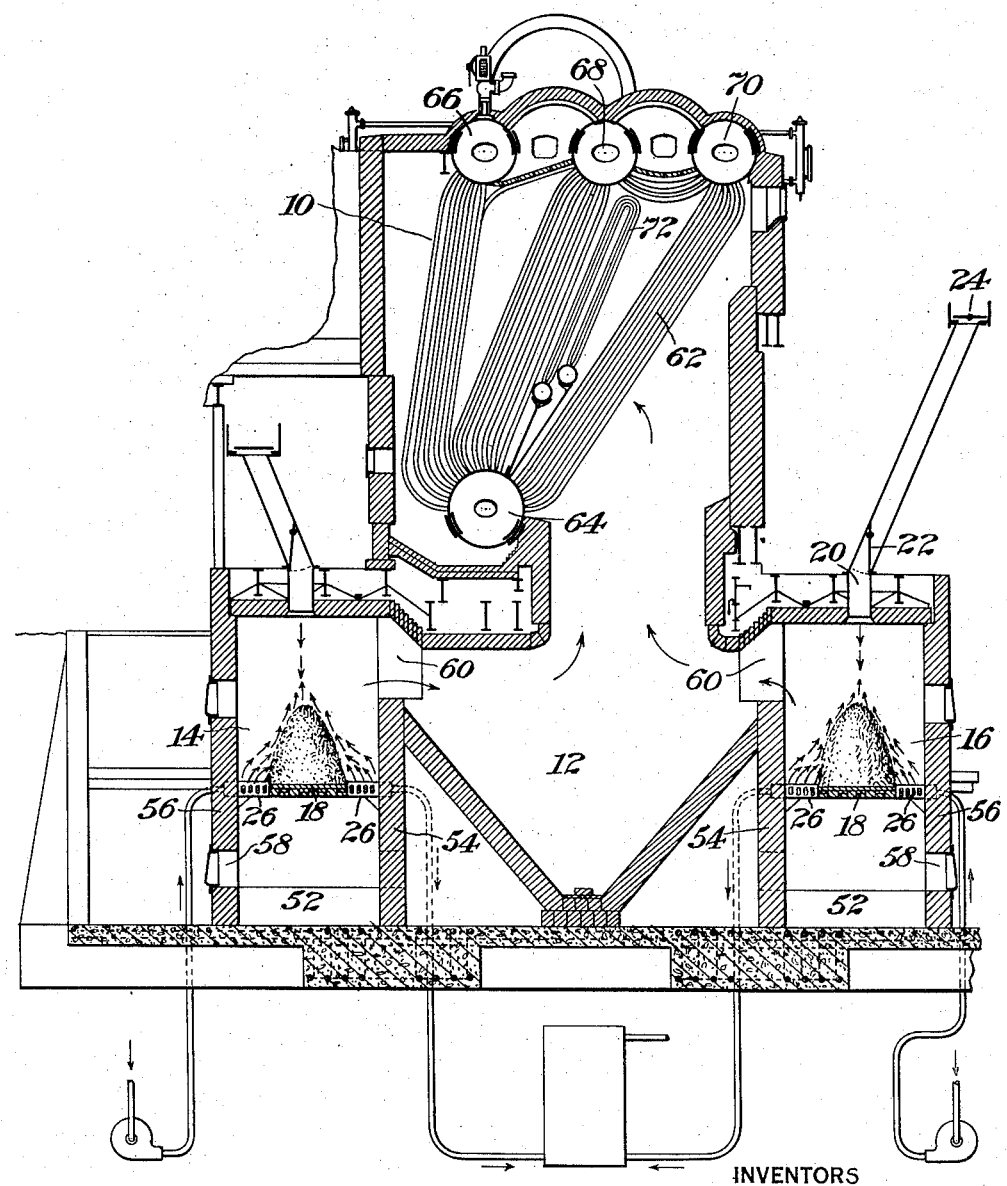

The illustrative apparatus has been found to be extremely successful in large steam generating installations in the North Pacific coast region where there is a large amount of available wood waste from sawmill operations. Such an installation is indicated in Fig. 1 of the drawings. It comprises a boiler indicated generally by the numeral 10. This boiler is located beyond a central flame or combustion chamber 12 and is preferably situated between furnaces 14 and 16. These furnaces are of the general type known as Dutch ovens.

In each furnace there is a grate structure shown as around the sides of a centrally located and imperforate fuel supporting table or hearth 18 preferably located directly beneath a fuel feeding passage 20 equipped with a gate 22 for regulating the fuel feed delivered by a conveyor 24.

Figure 8:
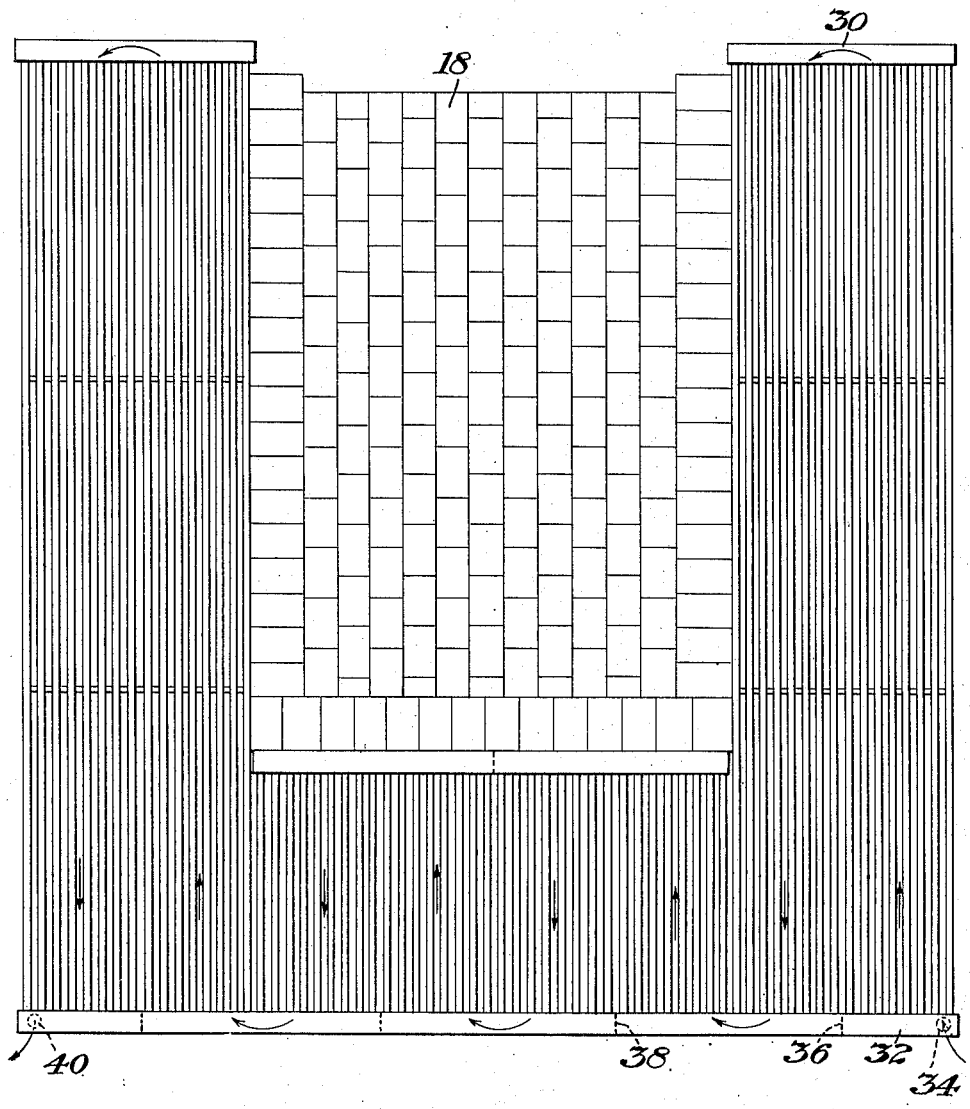
Fig. 8 is a plan of the bottom of the furnace showing the grate and hearth.

The preferred construction of grate is indicated in Fig. 8. Fig. 7 is a diagrammatic illustration showing the relation of the water cooled grate sections 26 to the central fuel table or hearth 18.

In Fig. 7 the fuel is shown in the form of a pile with its marginal portions extending slightly beyond the hearth. Combustion air comes up through the grate sections burning the fuel falling down the outer sides of the pile. Preheating the combustion air to a temperature such as 500° F. promotes effective combustion of the fuel here used, this fuel having a high moisture content.

The grate shown in Fig. 8 consists of a water tube structure embracing the central fuel table or hearth 18. At one side of the fuel table the water tubes extend between header sections 30 and 32. Boiler feed water is caused to flow from a pump to the header 32 through the inlet 34. It then proceeds toward the section 30 through the tubes at the right hand side of the baffle 36. The water is then directed through the header 30 to the next group of tubes at the left. It passes through these tubes to the header section between the baffles 36 and 38. Such back and forth circulation continues through the grate structure until the water leaves the grate at the outlet 40 to proceed to a feed water heater 74 whence it is delivered to the boiler. Thus the grate has what is known as a "once-through" flow of water.

The water cooled grate header is constructed from sheet metal a strip of which is first bent to such U-shape form as that indicated in Fig. 6. This forms a trough into which the tubes are extended for a small distance. The tubes nearly close the open side of this trough when they are assembled with relation to it. After this assembly the tubes are welded to the sides of the header trough. The welding metal applied in this operation completely closes the fourth side of the header trough. This weld metal is indicated at 42 in Fig. 6.

Baffles 38 are secured in the header and the ends of the header trough are thereafter closed to form a water circulation system. This type of construction promotes economy of manufacture and has been found to materially decrease the cost of grate maintenance in large power plants. It is to be appreciated that the water pressure within the grate is practically negligible, being just large enough to produce circulation.

As indicated in Fig. 3 of the drawings the water circulation tubes of the grate are vertically flattened intermediate the headers. This is indicated at 44. Desirable increase of the spacing of the grate tubes for air flow is thus effected. There is an arrangement of rounded end portions of the tubes where they join the header. Such rounded portions are indicated at 46. This facilitates the welding process whereby the headers are completed.

The illustrative method of grate manufacture is also facilitated by the use of tubes having square ends as indicated in Fig. 5. Such tube ends 48 more nearly fill the end of the header trough before the welding takes place. In Fig. 5 the vertically flattened portions 50 are shown. As above described such flattened portions extend between the headers.

Each Dutch oven shown in Fig. 1 includes an ash pit 52. Such pits are large enough to provide for supply of air blown from a preheater to pass up evenly through the water cooled grate sections around the pile of burning fuel. The walls of the ash pit are indicated at 54 and 56. Removal of the ashes is permitted by a door 58.

The gases of partial combustion pass through an opening 60 in the wall 54 to the combustion chamber 12 where combustion is completed. Passing to the combustion chamber they come into contact with the tube bank 62 of a water tube boiler including a lower drum 64, upper drums 66, 68, 70 and a superheater 72.

Although this invention has been described with relation to a particular structure it is not limited to the details thereof, but is of a scope commensurate with the scope of the appended claims.

What we claim, is:

1. A furnace for burning waste wood products comprising, in combination; a combustion chamber; an ash pit; a refractory fuel table above the ash pit and located centrally of the chamber; a water cooled grate structure embracing the table and consisting of a number of series of vertically flattened tubes, U-shaped pressed steel headers connecting adjacent series of tubes, baffles in the headers to direct water in opposite directions through the tubes of adjacent series to produce a once-through circulation in the grate; means for directing combustion gases through the embracing parts of the grate to pass over the table and its supported fuel from opposite sides; and means to circulate water through the tubes.

2. A boiler system comprising, in combination, a furnace for burning cellulosic fuels of high moisture content, an ash pit for the furnace, a refractory fuel supporting table located centrally of the furnace and above the ash pit, a tubular water cooled grate embracing the table, sheet steel headers forming the ends of the grate, seamless steel tubing connecting the headers and forming the grate bars, a feed water inlet for the grate, a hot water outlet for the grate, baffles in the headers for directing the feed water back and forth through adjoining series of grate tubes in a once-through circulation, walls enclosing the furnace, a boiler beyond the walls, a steam drum, conduits for conducting the combustion gases from the burning fuel to the boiler, means for circulating boiler feed water through the grate tubes, and conduits for conducting water from the grate tubes to the feed water heater and then to the drum.

3. A furnace for burning cellulosic products of high moisture content comprising, in combination; a combustion chamber; an ash pit; a refractory fuel table above the ash pit and located centrally of the chamber; a water cooled grate structure embracing the table and consisting of a number of series of tubes, U-shaped pressed steel headers connecting adjacent series of tubes, baffles in the headers to direct water in opposite directions through the tubes of adjacent series to produce a once-through circulation in the grate; means for directing combustion gases through the embracing parts of the grate to pass over the table and its supported fuel; and means to circulate water through the tubes.

4. A boiler system comprising, in combination, a furnace for burning miscellaneous cellulosic fuel of high moisture content, an ash pit, a refractory fuel supporting table located centrally of the furnace and above the ash pit, a tubular water cooled grate adjoining the table and extending continuously to embrace apart of the table, tubular headers forming the ends of the grate, metal tubing connecting the headers and forming grate bars, a feed water inlet for the grate, and a hot water outlet for the grate.

5. A furnace for burning cellulosic products of high moisture content comprising, in combination, a combustion chamber; an ash pit; a fuel table above the ash pit and located centrally of the chamber; a water cooled grate embracing one end of the table and consisting of a number of series of vertically flattened boiler tubes, and pressed steel headers connecting adjacent series of the tubes; means for directing combustion gases through the grate tubes to pass the table and its supported fuel; and means to circulate water through the tubes.

6. In a boiler furnace, a central refractory table for supporting fuel, means for maintaining fuel in a pile on the table, a tubular water cooled grate embracing the table, and means for providing a circulation of water through the grate.

7. In a steam boiler, a furnace of the Dutch oven type for burning cellulosic fuels of high moisture content; a fuel chamber, a fuel support in the chamber; means for continuously delivering the fuel to the chamber at a point above the support so that it will form a substantially conical pile which is maintained with its marginal portions burning; a permanent non-clinkering and non-burning water cooled grate having tubular sections embracing the support and exposed in part to ash and heat radiantly transmitted from the burning fuel; means whereby substantially all of the combustion supporting air passes through the embracing sections of the grate to maintain continuous combustion of the marginal parts of the fuel pile, and means for connecting the grate to a source of boiler feed water which is forced through the grate to the boiler; said grate sections including flat-sided forged steel tubes connected by welding.

CLAIRE C. SIMERAL.
ALF DRILL.